Figure 1:
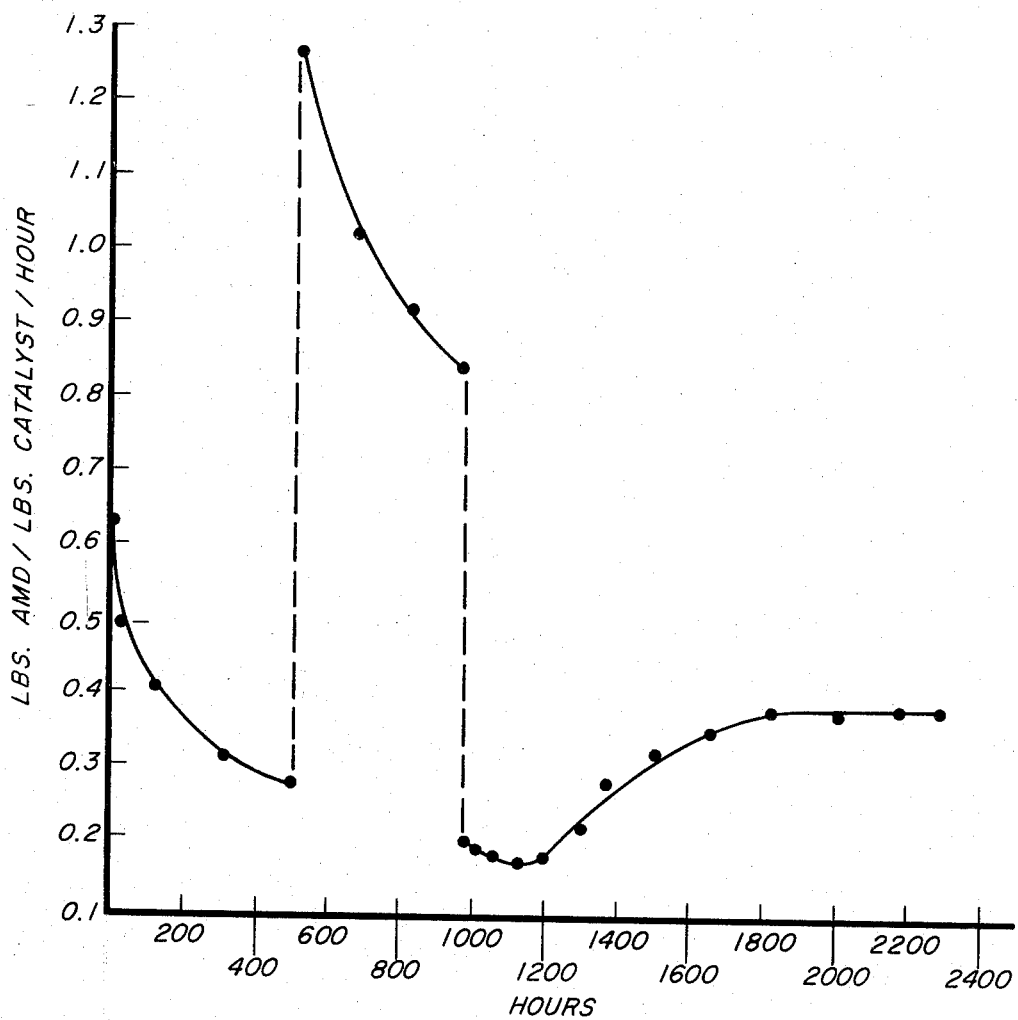

United States Patent [19]
Johnson et al.

[11] 3,869,511
[45] Mar. 4, 1975

[54] IMPROVED CATALYTIC HYDRATION OF NITRILES

[75] Inventors: Robert Bird Johnson, Metairie, La.; David Henry Rakowitz, Cos Cob, Conn.; William Austin Barber; John Allan Fetchin, both of Stamford, Conn.

[73] Assignee: American Cyanamid Company, Stamford, Conn.

[22] Filed: Dec. 20, 1972

[21] Appl. No.: 316,810

[52] U.S. Cl........... 260/561 N, 260/558, 260/561 R
[51] Int. Cl............................................ C07c 103/08
[58] Field of Search................................. 260/561 N

[56] References Cited
UNITED STATES PATENTS

| | | | |
|---|---|---|---|
| 2,758,135 | 8/1956 | Miller | 260/561 |
| 3,381,034 | 4/1968 | Greene et al. | 260/561 N X |
| 3,766,088 | 10/1973 | Yoshimura et al. | 260/561 N X |
| 3,767,706 | 10/1973 | Habermann et al. | 260/561 N |

Primary Examiner—Lewis Gotts
Assistant Examiner—Ethel G. Love
Attorney, Agent, or Firm—Gordon L. Hart

[57] ABSTRACT

Addition of certain anions such as chloride in aqueous acrylonitrile feed solution for catalytic hydration of acrylonitrile to acrylamide using solid copper catalysts is found to improve and sustain the catalytic activity for extended periods of use.

6 Claims, 3 Drawing Figures

IMPROVED CATALYTIC HYDRATION OF NITRILES

The invention relates to improvements in catalytic hydration of nitriles and more particularly to improvements in the hydration of nitriles by reaction of a selected nitrile in the presence of particulate solid catalyst comprising elemental copper.

It had been previously discovered that certain particulate solid catalysts containing elemental copper can catalyze the hydration reaction of nitriles and water to selectively convert the nitrile to the corresponding amide. Selectivity of the conversion with some catalysts is extremely high, approaching near 100 percent selectivity of conversion to the amide in some instances, when copper-containing catalysts are used. Several types of solid catalysts comprising elemental copper have been discovered for this use. Fine particulate copper prepared by reduction of copper sulfate with sodium borohydride in aqueous solution and precipitated as flocculent aggregates of extremely finely divided copper particles having high surface area, is one of the most preferred elemental copper catalysts for the hydration of nitriles. Another especially preferred one of such hydration catalysts is the product of reduction of copper-chromium oxide with elemental hydrogen. Not all copper solids are equally active as catalysts for the hydration of nitriles and the most preferred of such catalysts appear to be those that have been freshly prepared by reduction of a copper compound, such as those preferred catalysts described above.

A disadvantage with the hydration of nitriles using such elemental copper catalysts has been the gradual decay of catalytic activity as the solid catalyst is used continuously in the hydration reaction over a period of several hours or several days.

We have discovered, in the catalytic hydration of nitriles with a catalyst which contains elemental copper as an essential catalyst component, that the rate of decay of the catalyst activity can be reduced so that catalyst life is effectively extended, and under certain circumstances catalytic activity can be maintained at more or less constant rate or actually increased as the hydration reaction proceeds, by the simple expedient of incorporating certain selected soluble anions at quite low concentration in the reactant feed stream of nitrile and water which is contacted with the catalyst to carry out the hydration reaction. Moreover, in certain other circumstances, the presence of the effective anions can even enhance the initial activity of the catalyst.

Those anions found effective for use in the invention are chloride, bromide, nitrite, and nitrate. These anions are found to have a favorable effect on the catalyst life or catalytic activity, or both. One example of an anion whose presence does not significantly improve catalyst activity is sulfate.

The effective concentration, of one or several anions of the effective class, in the reaction medium will depend upon several variable factors in the hydration reaction. In most instances, a concentration of effective anion for maintaining catalyst activity at a constant level will be in the magnitude from about 20 to about 1,000 parts (expressed as parts by weight of the Na salt) per million parts water (ppm) present in the solution. In most instances under constant operating conditions there will be an optimum concentration within the range defined for each of the several anions that are effective for this invention. When operating at such optimum concentration and after a period of operation for the continuous process to attain equilibrium, the catalyst activity will be maintained at a more or less constant value and the catalyst will produce at a steady rate of conversion of nitrile to amide. At other values of concentration of a selected effective anion within the effective range, but less than the optimum concentration, the activity of the catalyst will usually stabilize at a more or less constant activity but usually will produce acrylamide at lesser conversion rates. In other words, as the effective anion concentration value is varied more and more away from the optimum, the rate of conversion of nitrile to amide will usually be reduced. The optimum concentration of the effective anions under given conditions will vary from one selected effective anion to another and the optimum will vary with any selected anion, to some extent depending on the particular nature of the selected copper-containing catalyst, the selected nitrile and other variable process factors.

The temperature of the hydration reaction is an important variable as it affects the optimum concentration of anion for the invention. As the temperature of the reaction is increased, usually less of the anion will be needed for optimum improvement of catalyst activity at the higher operating temperature. For the catalytic hydration of acrylonitrile to produce acrylamide, it is preferred to operate the process at temperatures in the range from about 50° C. to about 120° C. In the case of chloride, optimum concentrations, expressed as ppm of NaCl, at various temperatures within this range are found to vary within a broad range from about 20 up to about 1,000 ppm.

Excessive concentration of chloride may be found in some instances to actually accelerate catalyst decay. For example, a salt concentration that maintained catalyst activity at 65° C. operating temperature, was found to be excessive and accelerated the decay of catalyst activity when the temperature was increased to 85° C. However, when the salt concentration was reduced, the lesser concentration of chloride caused a reduced rate of catalyst decay at the 85° C. operating temperature.

The effective anion can be readily introduced into the solution by dissolving a water-soluble salt that will ionize to yield the effective anion in aqueous solution. Cations of the salts appear to be inert with respect to any improvement of catalyst activity and almost any soluble salt of the selected anion can be selected for this use. Alkali metal and alkaline earth metal salts of the effective anions are suitable and sodium salts are preferred for their economy. At some geographic locations one or several of the effective anions will be found present to some extent in local water supplies. When an industrial water supply is available with effective or even optimum concentration of chloride or other effective ion, then such water may be used without any addition of salts. It will be most unusual however to find an available industrial water supply having the optimum concentration of the selected anion to maintain catalyst life at a desirable high activity. In most instances it should be expected that some addition to or treatment of the local supply of water will be necessary to prepare it for use in an aqueous reaction solution having the most preferred composition to take full advantage of the invention.

The reactant feed stream, in which the reactive nitrile and water are present with the effective anion salts in solution, is contacted with the solid catalyst for reaction time at least sufficient to produce significant conversion of the nitrile to amide. All components of the feed stream needed for the hydration reaction are preferably in a single phase solution, however, an immiscible second liquid phase, such as excess nitrile present in amount greater than the saturation amount for the amount of water present, may be tolerable in the reaction feed in some instances. The reaction conditions are mild. Pressure is necessary only as needed to maintain the reaction mixture in liquid phase at reaction temperature which may range from about 15° C. to about 150° C. depending to some extent upon the particular nitrile selected and to some extent upon the particular catalyst selected. For the hydration of acrylonitrile to produce acrylamide with either of the two types of preferred copper catalysts described above, the optimum temperature has usually been in the range from about 50° to 120° C.

The invention is described in more detail herein with particular reference to examples of the hydration of acrylonitrile to produce acrylamide. While these examples embody the most preferred mode of carrying out the invention, the invention is effective for the catalytic hydration of other nitriles in aqueous solutions in contact with active copper-containing solid catalysts. Water-soluble nitriles such as acetonitrile, benzonitrile and the like are typical examples of other useful nitrile reactants to which the invention can be applied with advantage. Less soluble nitriles may be solubilized to some extent in water by the use of a cosolvent such as acetone, ethanol or the like.

EXAMPLE I

Catalyst preparation: 28.3 gms. dextrose was added to 18.8 gms. NaOH in 1 liter distilled water. Then 39.3 gms. of $CuSO_4 \cdot 5H_2O$ dissolved in 250 ml distilled water was added. After which 3 gms. of $NaBH_4$ dissolved in 100 ml of 0.1N NaOH was added. The mixture was allowed to react for 2 hours at room temperature during which a finely divided flocculent copper precipitate was formed which was then washed with 3 liters of distilled water.

Reactor packing: 9½ gms. of the wet catalytic copper solids, prepared as described, was mixed with 23 gms. of 35 to 60 mesh alumina granules and the mixture was packed into a glass tube of 2.5 cm internal diameter.

A 7 percent acrylonitrile in water solution was first thoroughly purged with nitrogen and then passed continuously through the reactor, from top to bottom, at a temperature of 65° C. and inlet pressure of about 25 psig at varied feed rates in the range from 25 to 50 gm./hr. for a period of 2,200 hours, except during a 460 hour period of operation between 505 and 965 hours. During this 460 hour period of operation the operating temperature was increased to and maintained at 85° C. and the feed rate was varied within the range from 45 to 65 gm./hr. During the entire period from start to 1,180 hours, activity of the catalyst, as measured at 65° C., gradually declined over the entire period. From 1,180 hours until 2,200 hours, sodium chloride was added continuously to the feed solution to maintain 321 ppm NaCl in the feed.

Throughout the entire 2,200 hours, samples were taken at periodic intervals from the product stream at the reactor outlet and each sample was analyzed for acrylamide and other components. From the analytical and process data the rate of acrylamide conversion per lb. catalyst per hour in this reactor was computed on the basis of a constant 60 percent conversion of acrylonitrile which can be achieved by adjusted feed rate. The results are shown as plotted in FIG. 1. The decline of conversion rate values through the entire period at both operating temperatures, from start to 1,180 hours demonstrates the steady decay of catalyst activity. After sodium chloride was started in the feed stream at 1,180 hours, catalyst activity gradually increased until it attained a constant activity value at about 1,800 hours and the catalyst activity was maintained thereafter more or less constant by the constant presence of chloride ion in the feed for about 400 hours of continuous operation until the reactor was shut down.

EXAMPLE II

102 Gms. of Harshaw 0203T copper chromium oxide catalyst (⅛ inch pellets) containing 80 percent copper oxide and 17 percent chromium oxide was placed in a 1-inch diameter stainless steel reactor. Catalyst was reduced by heating in a stream of nitrogen to 175° C. then adding 1½ percent hydrogen to the nitrogen stream at a bed temperature of 180°–210° C. After about 2 hours, the $H_2$ was increased to 6 percent for ½ hour. The reactor was then cooled and flushed with $N_2$.

Using $N_2$ to protect the catalyst from the air, 88.9 gms. of reduced pellets were transferred to a glass, packed bed reactor. A 7 percent solution of acrylonitrile in water was first thoroughly purged with $N_2$, was then passed as the reactant feed stream continuously through the reactor, top to bottom, at a temperature of 75° C., and a pressure of 25 psig.

The reactor was run continuously for 3,200 hours, the only changes being occasional variations of the rate of feed within the range from 50 to 80 gm./hr. and occasional changes in the composition of the water used to prepare the 7 percent acrylonitrile feed. At regular intervals, product samples were collected as made under the several different operating conditions used and analyzed. A conversion value of pounds acrylamide produced per pound of catalyst per hour was calculated in the same manner as in Example I for each sample and those values are plotted in FIG. 2 vs. the operating time at which the samples were taken. Those values plotted directly indicate the relative catalyst activity at the time each sample was taken.

Figure 2:
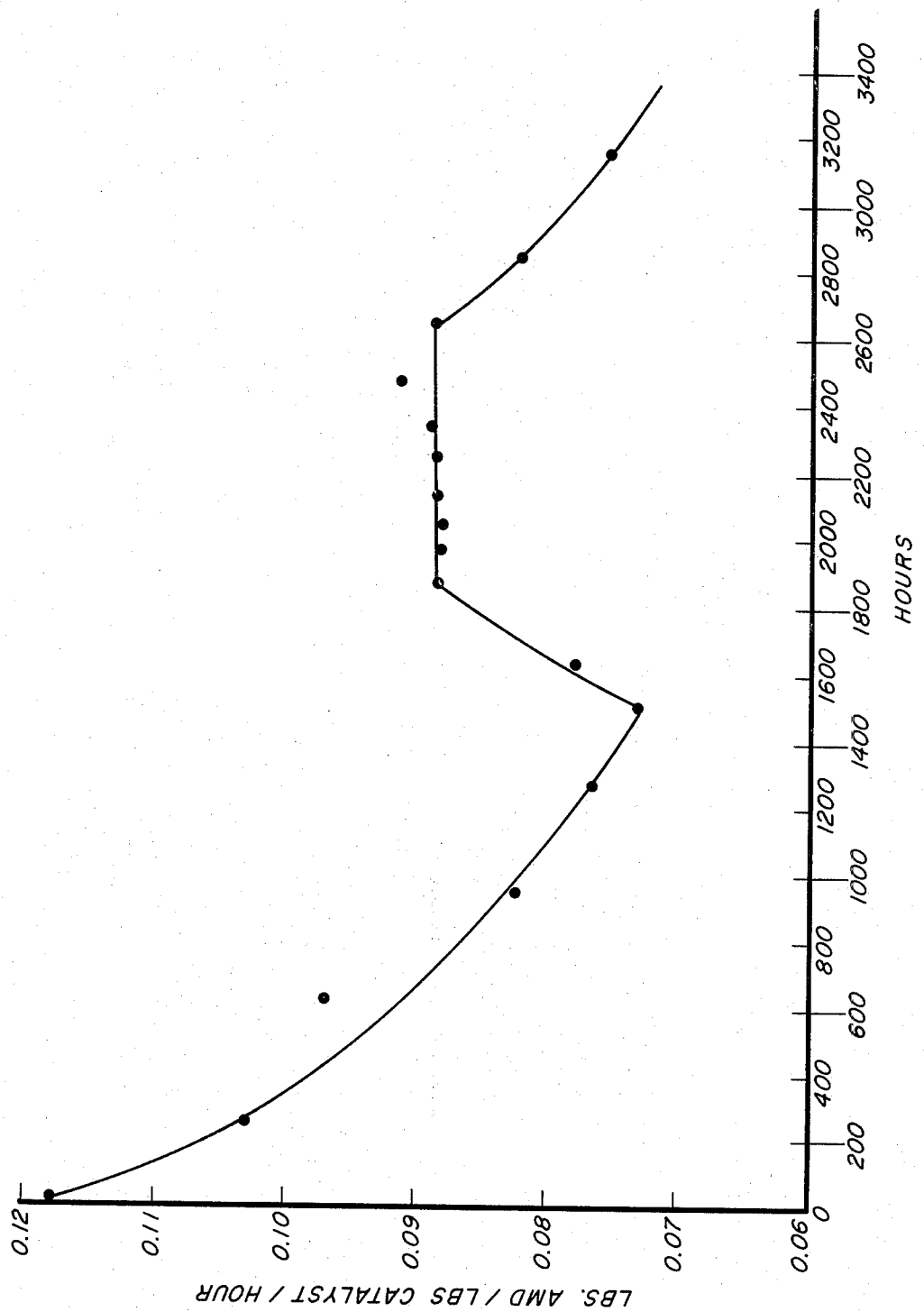

In FIG. 2, the values plotted from start to ca. 1,500 hours represent conversions using a feed of 7 percent acrylonitrile in either distilled or deionized water. From about 1,500 hours to about 2,500 hours the feed stream was a 7 percent solution of acrylonitrile in water having an initial analysis shown in Table 1 but neutralized to pH 7.3–7.8 with dilute sulfuric acid. From about 2,500 hours to shutdown at 3,200 hours the feed stream was 7 percent acrylonitrile in distilled $H_2O$. The improvement of catalyst activity during the period of use of the treated water is graphically illustrated in FIG. 1.

TABLE 1

| WATER ANALYSIS pH 10 | | | | | |
|---|---|---|---|---|---|
| Cations | | | Anions | | |
| Silica | 6.8 | ppm | Chloride | 31 | ppm |
| Aluminum | 0.28 | ppm | Sulphate | 49 | ppm |

TABLE 1-Continued

WATER ANALYSIS
pH 10

| Cations | | | Anions | |
|---|---|---|---|---|
| Iron | 0.02 | ppm | Total Alkalinity | 49 ppm |
| Calcium | 30.5 | ppm | | |
| Magnesium | 6.7 | ppm | | |
| Sodium | 22.7 | ppm | | |

Figure 3:
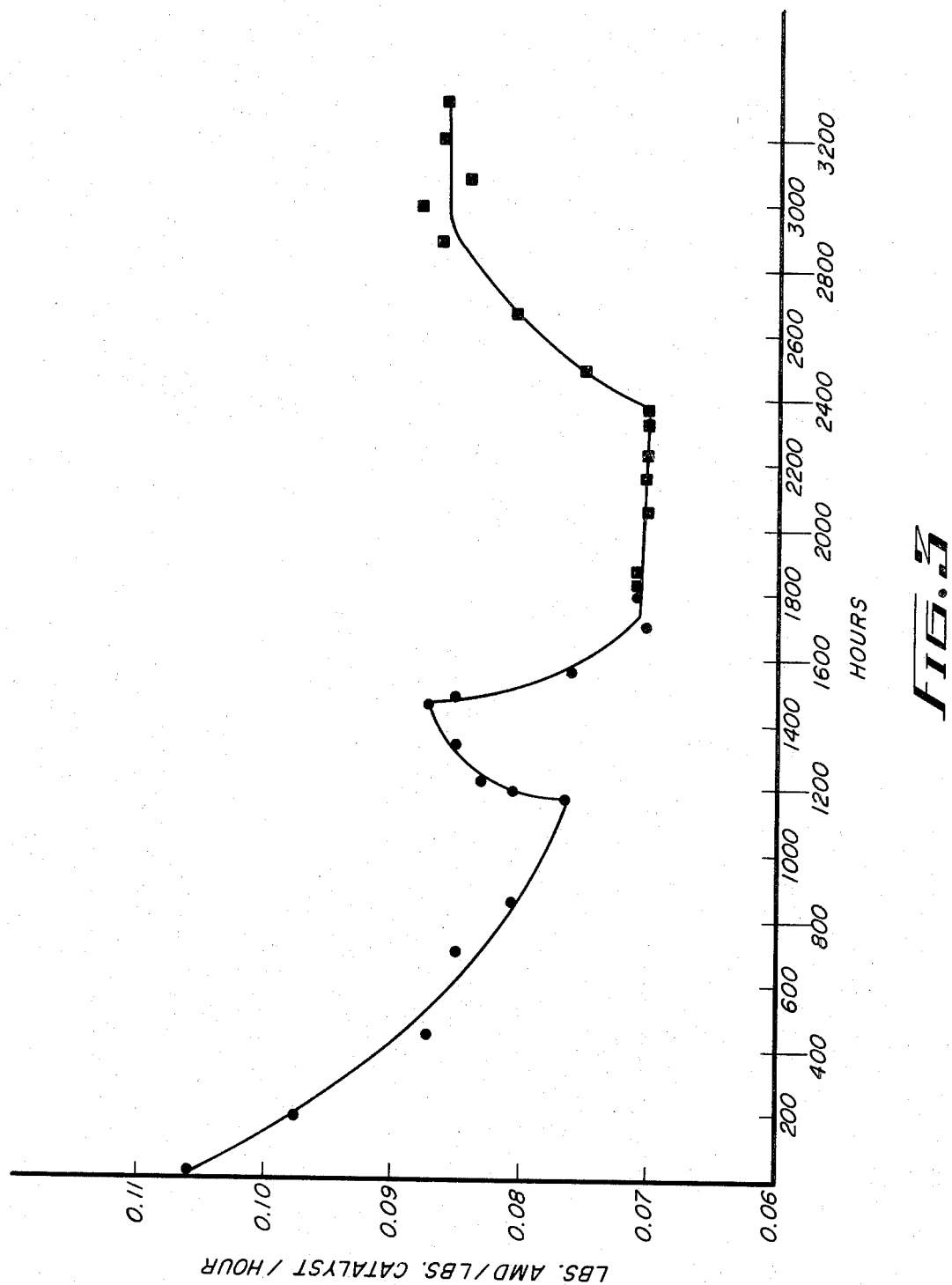

EXAMPLE III 133.8 Gms. of Harshaw 0203T copper chromium oxide catalyst, was reduced as described in Example II in a 1 inch diameter stainless steel reactor. After cooling and flushing the reactor with $N_2$, a feed stream of 7 percent solution of acrylonitrile in water was first purged with $N_2$, and then passed continuously through the reactor at a temperature of 75° C. and a pressure of 25 psig. The reactor was run continuously for over 3,000 hours with occasional variations of feed rate within the range from 55 to 80 gm./hr. Activity of catalyst at various times was determined as described in Example II. FIG. 3 is a graphic plot of catalyst activity during the course of the 3,000 hour test. From start to 1,180 hours the feed was a 7 percent acrylonitrile solution in distilled $H_2O$, from 1,180 hours to 1,462 hours the same feed was used except that the water contained:

100 ppm $CaCl_2$,
36 ppm $MgSO_4$ and
72 ppm $Na_2SO_4$.

From 1,462 hours to 1,800 hours the feed was the same 7 percent acrylonitrile in water except that the water contained:

155 ppm $CaSO_4 \cdot 2H_2O$ and
36 ppm $MgSO_4$.

From 1,800 hours to 2,350 hours the feed was the same 7 percent acrylonitrile in water except that the water contained:

107 ppm NaCl.

From 2,350 hours to shutdown, the feed was the same 7 percent acrylonitrile in water except that the water contained:

321 ppm NaCl.

Except during brief periods for sampling, the rate of feed was varied in the range from 55 to 80 gm./hr. of the 7 percent acrylonitrile feed stream.

The foregoing examples demonstrate the effect of chloride ion to stabilize catalyst activity in a continuous process when chloride ion is present in the feed solution. Also demonstrated is the relative ineffectiveness of any of the other ions which were present in feed solutions when chloride was absent. Only a very small concentration of chloride produces an appreciable effect, as was demonstrated in Example 2 wherein only 31 ppm of chloride (about 50 ppm if expressed as NaCl) was present. Example 3 indicates the increase of activity as chloride concentration is increased. Other anions, not used in Examples 1–3, have also been found to improve the catalytic activity of copper catalyst in the hydration of acrylamide, but chloride presently is the most preferred anion for the purpose. Those anions other than chloride that have been shown to significantly improve the activity of copper catalyst, similarly but varying somewhat in degree, when the anion is present in the aqueous nitrile reactant feed are bromide, nitrate and nitrite. Anions tested that were found inert, or even detrimental in some instances, with respect to their effect on catalyst activity included sulfate, thiocyanate, perchlorate and acetate. No significant effect on catalyst activity by any of the several cations used has been observed.

In a particular embodiment of the invention, instead of maintaining a constant effective supply of chloride or other effective anion in the reactant feed stream, the effective supply of an ion in the feed stream can be interrupted and supplied only intermittently during operation of the process, as needed to restore catalytic activity to a desired value. During periods when the effective anion is not used, the activity will decay gradually.

As the concentration of effective anion concentration is increased, the level of stabilized catalyst activity will usually be increased also but at excessively high concentrations in some instances, the excess of salt may actually accelerate catalyst decay or cause other deleterious effects.

We claim:

1. In a process of catalytic hydration of acrylonitrile with water to produce acrylamide, which process comprises contacting a reactant feed stream comprising the acrylonitrile and water with solid particulate catalyst comprising catalytic elemental copper freshly prepared by reduction of copper sulfate or copper chromium oxide, the improvement wherein chloride ion is present in said reactant feed stream in amount effective to at least inhibit the decay of catalyst activity as the catalytic hydration process proceeds.

2. The improvement defined by claim 1 wherein the effective concentration of chloride ion in said feed stream is at a concentration value in the range from about 20 to about 1,000 parts (expressed as parts NaCl) per million parts water in said feed stream and the reaction temperature is in the range from 50° to 120° C.

3. The improvement defined by claim 2 wherein a concentration of chloride ion is maintained in the feed stream at least sufficient to maintain a selected constant level of catalytic activity as the catalytic hydration proceeds.

4. The improvement defined by claim 2 wherein said chloride ion is introduced in concentration sufficient to increase the catalytic activity of a catalyst that has been partially spent during the course of the catalytic hydration.

5. The improvement defined by claim 2 wherein the catalyst is reduced copper chromium oxide.

6. The improvement defined by claim 2 wherein the catalyst is elemental copper in flocculent particulate form as reduced by borohydride from solution.

* * * * *